(12) United States Patent
Hauske et al.

(10) Patent No.: US 8,199,803 B2
(45) Date of Patent: Jun. 12, 2012

(54) RECEIVER STRUCTURE AND METHOD FOR THE DEMODULATION OF A QUADRATURE-MODULATED SIGNAL

(75) Inventors: Fabian Hauske, Wörthsee (DE);
Berthold Lankl, Egmating (DE);
Ernst-Dieter Schmidt, Feldkirchen-Westerham (DE);
Changsong Xie, München (DE)

(73) Assignee: Nokia Siemens Neworks GmbH & Co. KG, Munich (DE)

( * ) Notice: Subject to any disclaimer, the term of this patent is extended or adjusted under 35 U.S.C. 154(b) by 276 days.

(21) Appl. No.: 12/373,614

(22) PCT Filed: Jul. 5, 2007

(86) PCT No.: PCT/EP2007/056810
§ 371 (c)(1),
(2), (4) Date: Jan. 26, 2010

(87) PCT Pub. No.: WO2008/006768
PCT Pub. Date: Jan. 17, 2008

(65) Prior Publication Data
US 2010/0128772 A1    May 27, 2010

(30) Foreign Application Priority Data
Jul. 14, 2006 (DE) .................. 10 2006 032 786

(51) Int. Cl.
*H03H 7/30* (2006.01)
(52) U.S. Cl. ........ 375/232; 375/229; 375/230; 375/231; 375/262; 375/322; 375/341

(58) Field of Classification Search .................. 375/229, 375/231, 232, 233, 234; 708/300, 819; 714/786, 714/793, 794
See application file for complete search history.

(56) References Cited

U.S. PATENT DOCUMENTS
4,716,577 A   12/1987 Oexmann
(Continued)

FOREIGN PATENT DOCUMENTS
DE   10323407 A1   12/2004
DE   10338050 A1    3/2005
(Continued)

OTHER PUBLICATIONS
K. D. Kammeyer, Nachrichtenübertragung, Stuttgart, Teubner Verlag, ISBN 3-519-06142-2, pp. 494-497.

*Primary Examiner* — Dhaval Patel
(74) *Attorney, Agent, or Firm* — Laurence A. Greenberg; Werner H. Stemer; Ralph E. Locher (57) ABSTRACT

A receiver is provided for a quadrature-modulated signal, which can be divided into an inphase signal and a quadrature signal. The inphase signal is fed to first and third equalizers, and the quadrature signal is fed to second and fourth equalizers, wherein the first and second equalizers each perform a first equalization of the respective signal. An output of the first equalizer is connected to a second input of the fourth equalizer, which, by means of a second equalization of the quadrature signal, transmits an equalized quadrature signal as a function of the previously fed equalized inphase signal of the first equalizer. An output of the second equalizer is connected to the second input of the third equalizer, which, through a second equalization of the inphase signal, transmits an equalized inphase signal as a function of the previously fed equalized quadrature signal of the second equalizer.

21 Claims, 4 Drawing Sheets

U.S. PATENT DOCUMENTS

| | | | |
|---|---|---|---|
| 6,819,943 B2 * | 11/2004 | Dalal | 455/562.1 |
| 2003/0007552 A1 | 1/2003 | Krupka | |
| 2003/0063681 A1 | 4/2003 | Olivier | |
| 2005/0163205 A1 * | 7/2005 | McCallister | 375/229 |

FOREIGN PATENT DOCUMENTS

| | | |
|---|---|---|
| EP | 0 218 181 A | 4/1987 |
| EP | 0 237 287 A | 9/1987 |
| EP | 1494413 A1 | 1/2005 |

* cited by examiner

RECEIVER STRUCTURE AND METHOD FOR THE DEMODULATION OF A QUADRATURE-MODULATED SIGNAL

CLAIM FOR PRIORITY

This application is a national stage application of PCT/EP2007/056810, filed Jul. 5, 2007, which claims the benefit of priority to German Application No. 10 2006 032 786.1, filed Jul. 14, 2006, the contents of which hereby incorporated by reference.

TECHNICAL FIELD OF THE INVENTION

The invention relates to a receiver and method for demodulating a quadrature-modulate signal.

BACKGROUND OF THE INVENTION

Digital information is transmitted by one or more signals using a multiplicity of methods. To generate a signal with digital information, so called digital modulation methods are used. In these methods the binary information is impressed or modulated onto a carrier. It is a characteristic of the digital modulation methods that only discrete amplitude, phase or frequency values are used for the impression, such a discrete value corresponding to a binary value or a binary sequence. In principle, these digital modulation methods are divided into amplitude shift keying, ASK for short, phase shift keying, PSK for short, or frequency shift keying, FSK for short. Combinations of amplitude, phase and/or frequency shift keying are also possible, however. Frequently, a combination of amplitude and phase shift keying is used which is also called quadrature amplitude modulation, QAM for short. Depending on the number of discrete values, it is called 16-QAM, 64-QAM etc., a discrete value in each case corresponding to a particular amplitude and phase value of the signal.

When two discrete amplitude, phase or frequency values are used, one value, as a rule, corresponds to a logical zero and the other value to a logical one. If several discrete values are used, each value corresponds to a binary sequence. In the case of four discrete values, for example, as in the case of quaternary phase shift keying, 4-PSK or QPSK for short, in which four phase states such as 0 degrees; 90 degrees; 180 degrees; 270 degrees are defined, in each case two bits per value can be transmitted (00, 01, 11, 10). In the case of eight defined values as in the case of an octonary amplitude (8-ASK), phase (8-PSK), or frequency (8-FSK) shift keying or octonary quadrature amplitude modulation (8-QAM), three bits can be transmitted simultaneously.

The use of a multiplicity of discrete values or levels is also called multi-level modulation or multi-level modulation method, respectively.

To generate multi-level signals, particularly multi-level phase-modulated or amplitude-phase-modulated signals, the so-called quadrature modulation is frequently used. In this arrangement, a generated carrier is duplicated into a first and second carrier. The first carrier is directly modulated with a first, so-called in-phase signal. The second carrier is modulated with a second, so-called quadrature signal and displaced by 90° or Pi/2 in phase with respect to the first carrier. Following this, both carriers modulated in this manner are combined again and form a so-called quadrature-modulated signal. The in-phase and quadrature signals are generated by an encoder. The latter generates the corresponding in-phase and quadrature signals from the data signal supplied. This is shown in principle in FIG. 1 for an optical transmission. A data signal, for example a 40-Gbit signal, is supplied to an encoder EN which in each case generates an in-phase and quadrature signal. These are in each case supplied to a Mach-Zehnder modulator MZM which in each case modulates a carrier which is generated by a laser diode and supplied to both Mach-Zehnder modulators MZM. One of the two modulated carriers is phase shifted by 90° or Pi/2 and the two signals are then combined by a combiner C to form a quadrature-modulated signal. This signal is transmitted by means of a transmission link US which is constructed as optical waveguide SSMF and can have dispersion-compensating means DCF and amplifiers EDFA. At the receiver end, the transmitted signal is band-pass filtered, if necessary, in a receiver RX and the two in-phase and quadrature signals are recovered with means known to the expert.

There is a number of methods available for evaluating the received in-phase and quadrature values.

The received in-phase and quadrature values are evaluated with equalizers, deciders and filters, respectively.

An equalizer in the sense of the present invention is understood to be a decider which delivers a decision in accordance with a predetermined decision space depending on the level of the signal supplied. This decision space is defined by so-called metrics.

An optimal equalization of multi-level modulation methods is known from the field of electrical communication, an implementation for arbitrary data rates being restricted by the processing speed of electronic components. An optimum equalization which may be achievable in the electrical domain is not possible, in particular, in the optical transmission with correspondingly high data rates.

An equalization is specified in US 2003/0007552 A1 which uses for this purpose a reduced alphabet equalizer with iterative equalization.

In US 2003/0063681 A1, an arrangement and a method for recognizing digital data by means of MLSE and dynamically varied trellis is specified.

In European patent application EP 1 494 413 A1, an MLSE for optical systems is specified which works with a one-dimensional metric and determines the latter.

Figure 2:
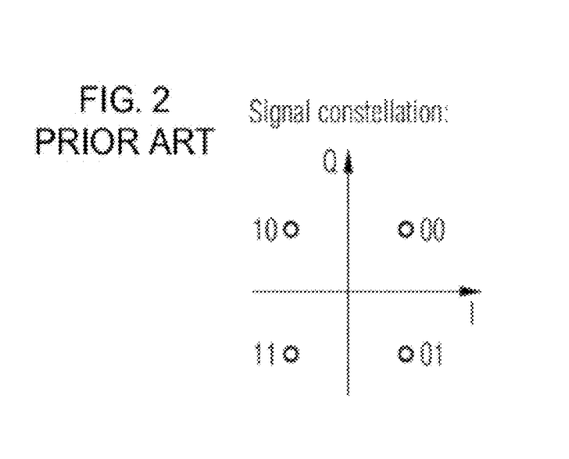
FIG. 2 show a signal constellation.

The two in-phase and quadrature signals form the quadrature-modulated signal. This can be represented illustratively in a two-dimensional plane, the in-phase signal being shown on the X-axis and the quadrature signal being shown on the Y axis. A signal value or signal state of the quadrature-modulated signal is a point in this two-dimensional plane. The amplitude corresponds to the distance from the center point and the phase corresponds to the angle referred to the positive X axis in the counterclockwise direction. In the case of a phase modulation or phase shift keying with constant amplitude, the discrete phase values are thus located on a circle around the center point of the coordinate system and the phase angle or phase value corresponds to the angle to the positive X axis. In FIG. 2, this is shown by way of example for quaternary phase shift keying (QPSK). Four discrete phase values (45°, 135°, 225°, 315°) are shown to which a dual bit is in each case allocated (00, 10, 11, 01).

In the case of an amplitude phase modulation or quadrature amplitude modulation, respectively, discrete points are established in accordance with a raster in the two-dimensional coordinate system for a bit sequence. The angle and the distance from the center point form phase and amplitude values, respectively.

SUMMARY OF THE INVENTION

The present invention discloses the demodulation of quadrature-modulated signals.

In one embodiment of the invention, the in-phase signal is determined by a cross-connected arrangement of several equalizers, taking into consideration the quadrature signal determined, and vice versa, as a result of which a more accurate determination of the transmitted signal sequence is possible. Furthermore, this determination can be implemented in a simple and economic manner particularly in the case of optical transmission, even at high data rates.

In an embodiment of the invention, the equalization is carried out several times so that the signal transmitted originally is determined even more accurately.

BRIEF DESCRIPTION OF THE DRAWINGS

An exemplary embodiment of the invention will be explained in greater detail with reference to the drawing, in which.

DETAILED DESCRIPTION OF THE INVENTION

Figure 1:
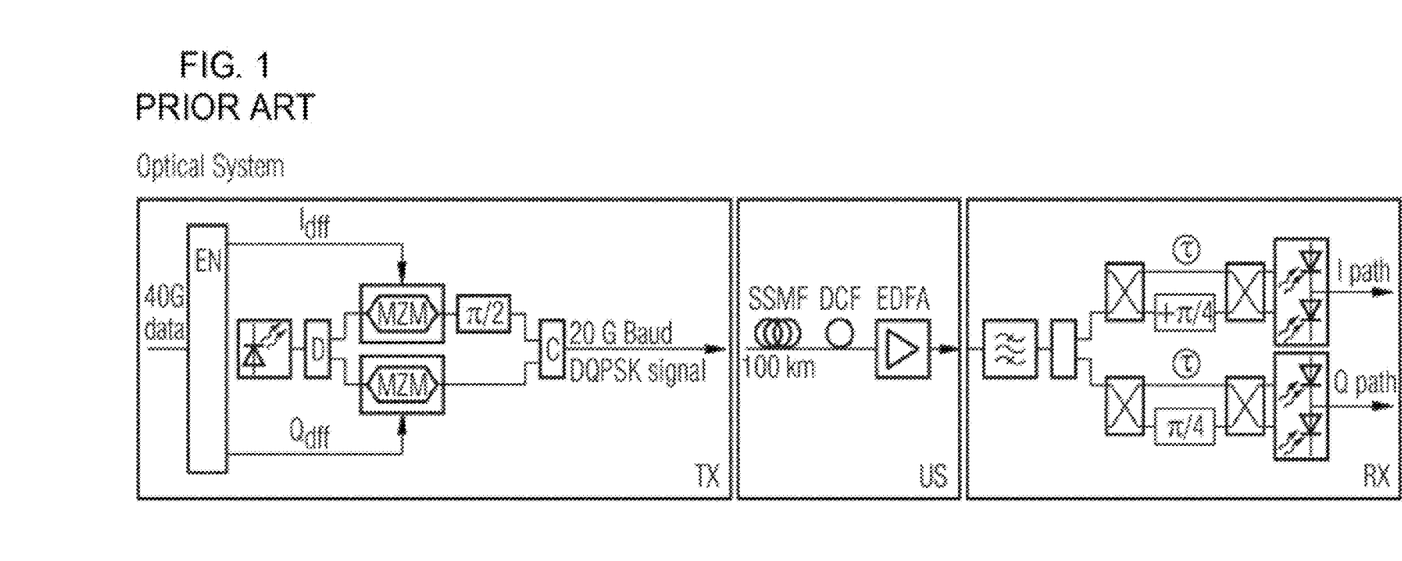
FIG. 1 shows an optical transmission system.

FIG. 1 shows an optical transmission system according to the prior art, already described in the introduction. FIG. 2 shows a signal constellation, already described, for a QPSK signal or quadrature phase shift keying signal, respectively.

Figure 3:
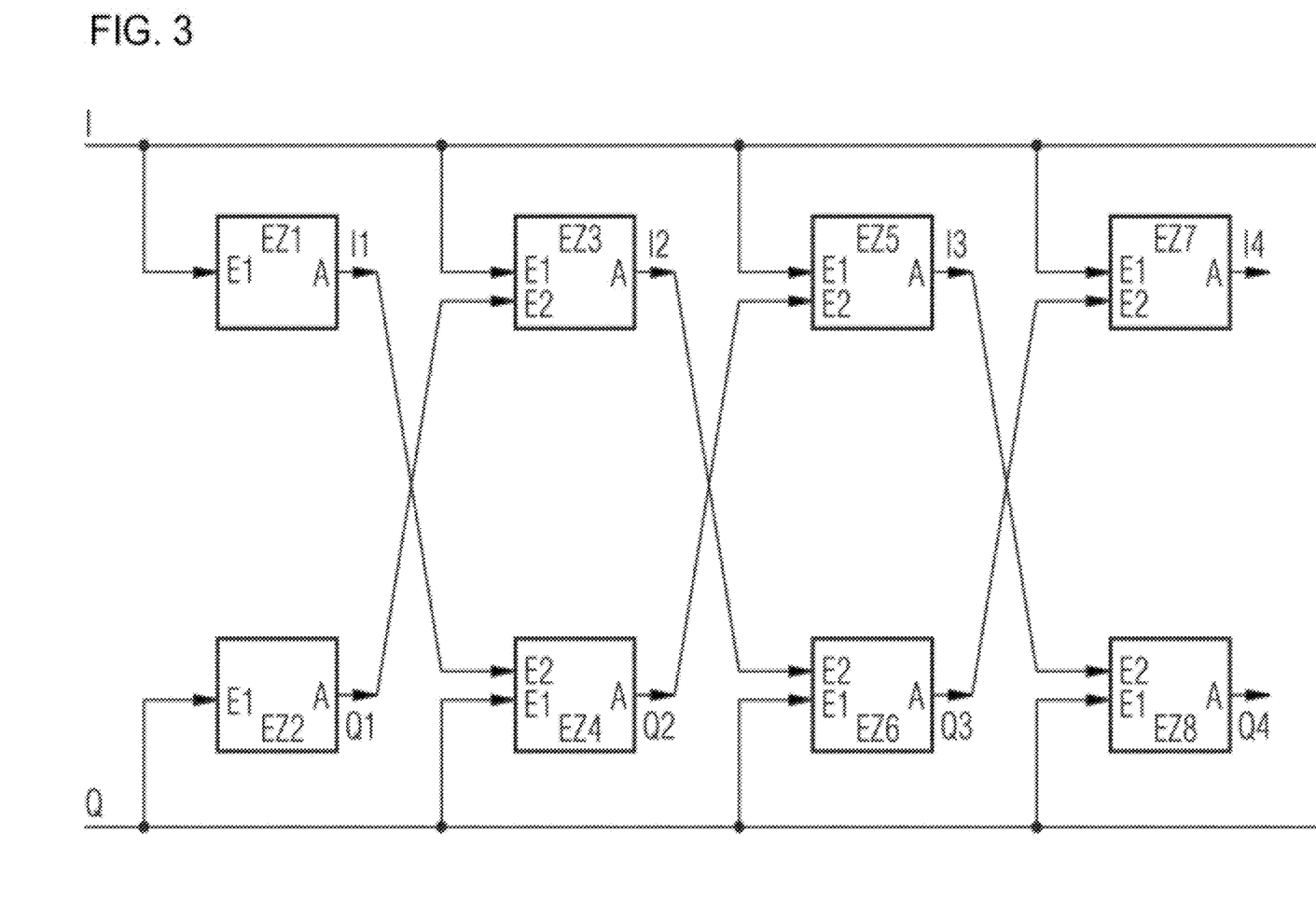
FIG. 3 shows a block diagram of the receiver arrangement according to the invention.

FIG. 3 shows a block diagram of the arrangement according to the invention for evaluating the in-phase and quadrature signal. It has eight equalizers EZ1 to EZ8. The in-phase signal is in each case supplied to equalizers EZ1, EZ3, EZ5 and EZ7 at their first input E1. The quadrature signal Q is in each case supplied to equalizers EZ2, EZ4, EZ6, and EZ8 at their first inputs E1. The output signal I1 of the first equalizer EZ1 is supplied to a second input of the fourth equalizer EZ4. The output signal Q1 of the second equalizer EZ2 is supplied to a second input of the third equalizer EZ3. The output signal I2 of the third equalizer EZ3 is supplied to a second input of the sixth equalizer EZ6. The output signal Q2 of the fourth equalizer EZ4 is supplied to a second input of the fifth equalizer EZ5. The output signal I3 of the fifth equalizer EZ5 is supplied to a second input of the eighth equalizer EZ8. The output signal Q3 of the sixth equalizer EZ6 is supplied to a second input of the seventh equalizer EZ7, at the output of which the equalized in-phase signal I4 is delivered. At the output of the eighth equalizer EZ8, the equalized quadrature signal Q4 is delivered.

The operation is as follows. In in-phase signal I is supplied to the first equalizer EZ1 which equalizes the in-phase signal I and delivers an equalized first in-phase signal I1 and supplies it to the fourth equalizer EZ4. The latter equalizes the quadrature signal Q supplied to it in dependence on the equalized first in-phase signal I1 and delivers an equalized second quadrature signal Q2 at its output.

The second equalizer EZ2 equalizes the quadrature signal Q supplied to it and delivers an equalized first quadrature signal Q1 which is supplied to the third equalizer EZ3. The latter equalizes the in-phase signal I supplied to it at the first input in dependence on the equalized first quadrature signal Q1 and delivers an equalized second in-phase signal I2 at its output A.

In the invention, the second in-phase signal I2 equalized in this manner and the second quadrature signal Q2 equalized in this manner are now available for further processing.

The advantage consists in that there is not only a singular equalization of the respective signal but an equalization of the signal in dependence on the respective other signal transmitted and equalized. This provides for a more accurate decision about the transmitted signal sequence.

The equalized second in-phase signal I2 and the equalized second quadrature signal Q2 can now be repeatedly equalized in further stages, taking into consideration the respective other signal component. According to FIG. 3, the equalized second in-phase signal I2 is thus supplied to a further equalizer EZ6 at its second input, which equalizes the quadrature signal Q supplied to it at its first input E1 in dependence on the equalized second in-phase signal I2 and delivers an equalized third quadrature signal Q3 at the output. This can be supplied to a further stage. According to FIG. 3, the equalized third quadrature signal Q3 is supplied to a second input of the seventh equalizer EZ7 which equalizes the in-phase signal I supplied at its first input E1 in dependence on the equalized third quadrature signal Q3 and delivers a fourth equalized in-phase signal I4 at its output.

Correspondingly, the equalized second quadrature signal Q2 of the fourth equalizer EZ4 is supplied to the fifth equalizer EZ5 at its second input. The latter equalizes the in-phase signal I supplied at its first input in dependence on the supplied equalized second quadrature signal Q2 and delivers an equalized third in-phase signal I3 at its output. This signal, in turn, can be supplied to a second input of the eighth equalizer EZ8 which equalizes the quadrature signal Q supplied at its first input in dependence on said quadrature signal Q and delivers at its output A an equalized fourth quadrature signal Q4.

Further stages for equalization can be correspondingly connected downstream.

It is the core of the invention that at least one first stage of equalization is carried out with equalizers EZ1, EZ2 which is followed by a second stage of equalization with equalizers EZ3, EZ4 which equalize their respective signal in dependence on the first equalization of the respective other signal.

These can be followed analogously by third, fourth, fifth etc. stages.

Figure 4:
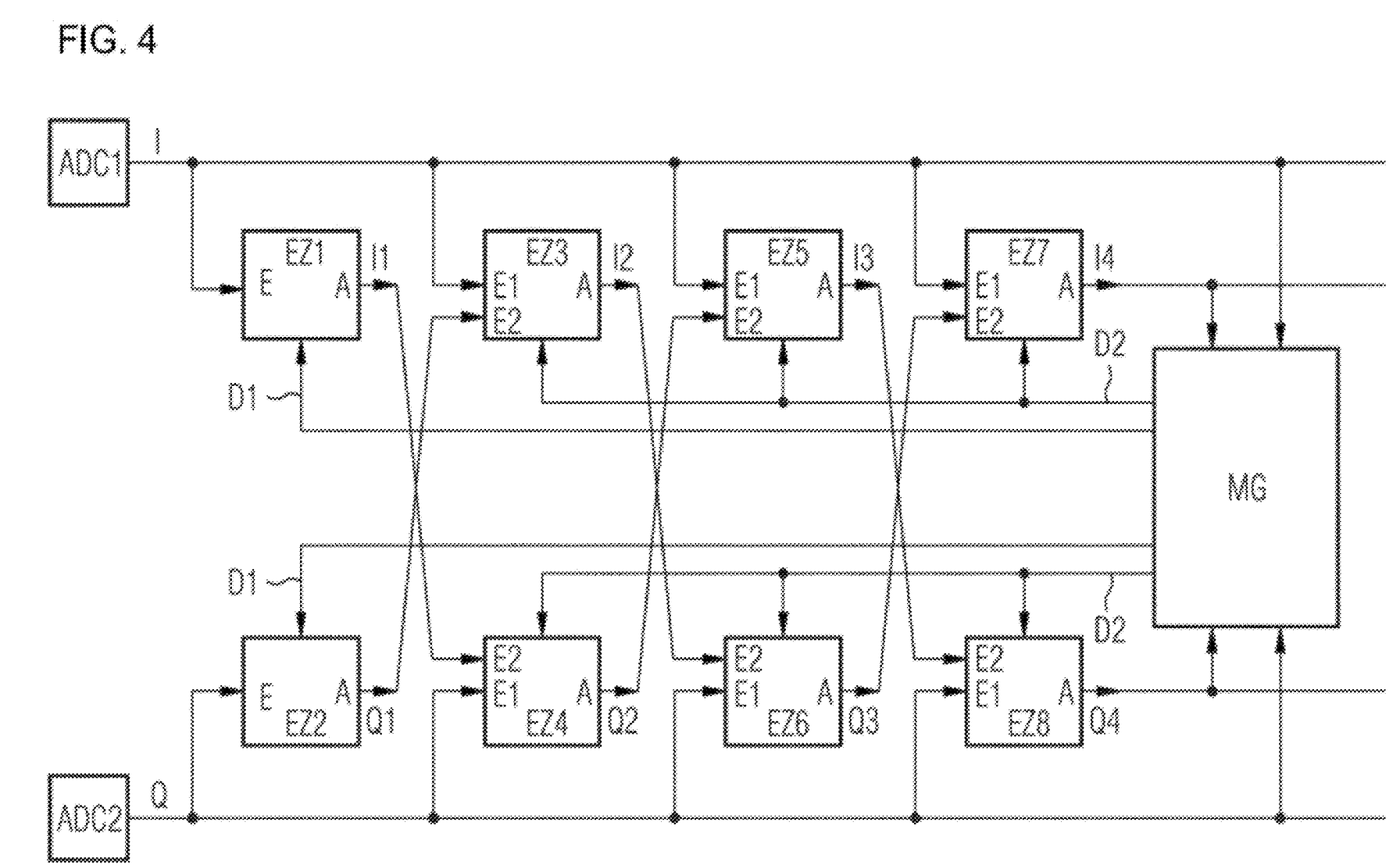
FIG. 4 shows a further embodiment according to FIG. 3.

FIG. 4 shows an arrangement according to FIG. 3, with the difference that before the equalization, the in-phase and quadrature signals are converted from analog to digital by means of analog/digital converters ADC1, ADC2 so that a digital equalization can be performed. For this purpose, the equalizers can be constructed as digital filters or maximum likelihood sequence estimation equalizers. These maximum likelihood sequence estimation equalizers or devices, MLSE for short, usually have a comparison or decision table which is filled with data and metrics in order to be able to reliably estimate the transmitted signal sequence of the respective channel. The invention is thus quite suitable for trellis-coded signals.

The data of the metrics are generated by a metrics generator MG which is supplied, on the one hand, with received in-phase and quadrature signals and, on the other hand, the equalized in-phase and quadrature signal or signals, i.e. the equalized in-phase or quadrature signal of the last stage depending on the number of stages. By comparing the unequalized and equalized in-phase and quadrature signals and by using previously determined test sequences, estimations about the decision space for a signal sequence transmitted in the respective signal path (in-phase or quadrature) can thus be determined. These data or metrics are supplied to the equalizers by means of which the latter are initialized or loaded.

The data or metrics are stored in a comparison table of the equalizer. A suitable algorithm, such as e.g. the Viterbi algorithm, now determines from the supplied (in-phase, quadrature) signals by means of the table the signal sequence most probably transmitted. In the equalizers (EZ1, EZ2) of the first stage, this determination is carried out on the basis of the supplied in-phase or quadrature signal alone. In the equalizers of the subsequent stage(s), this determination is carried out taking into consideration the other signal. More complex data or metrics are used in the equalizers of the subsequent stage(s).

Figure 5:
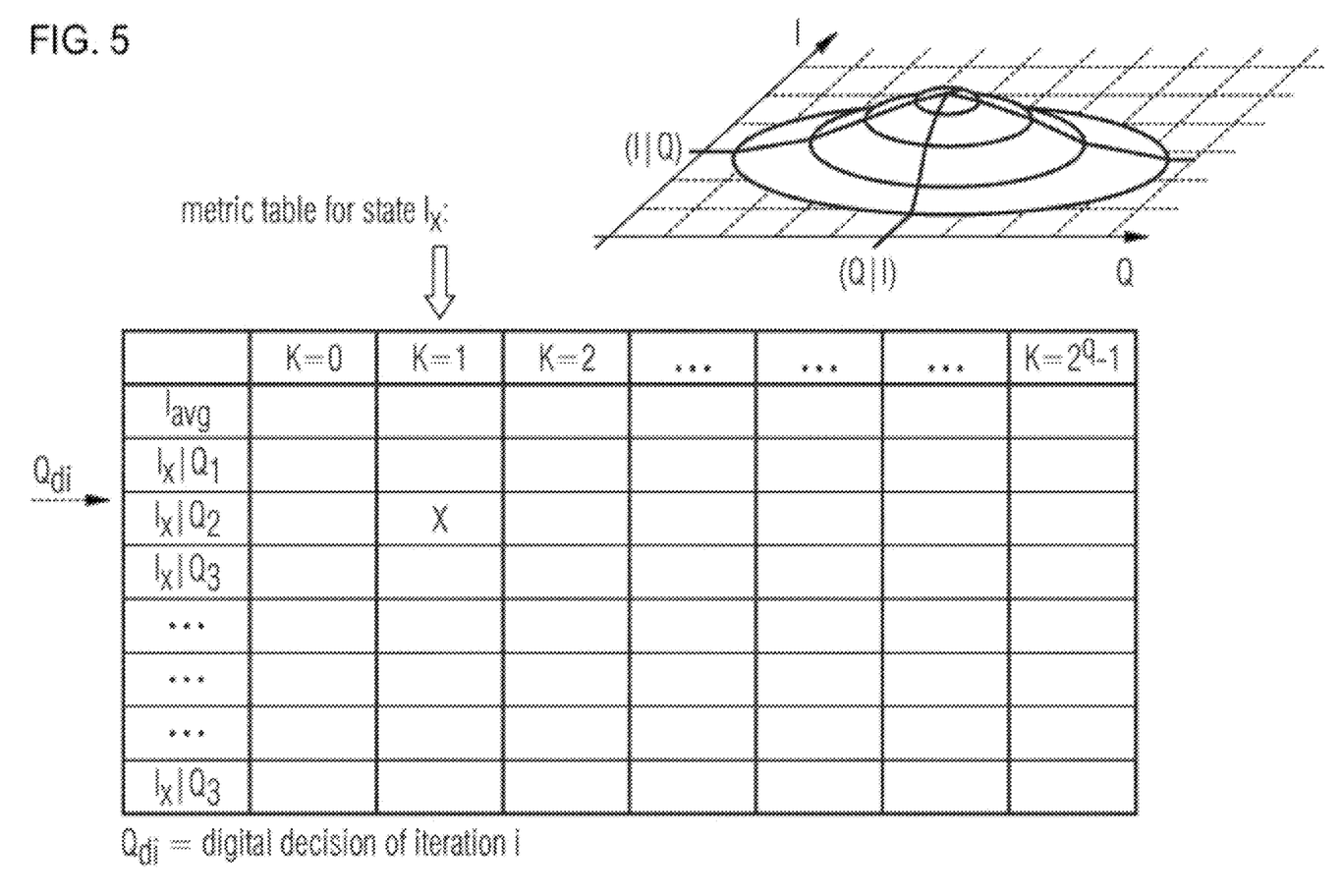
FIG. 5 shows a diagram and a table for explaining the invention.

Such a table with decision diagram for selecting a metric is shown in FIG. 5.

An equalizer in the sense of the present invention is understood to be a decider which delivers a decision according to a predetermined decision space depending on the level of the signal supplied.

In this arrangement, an equalizer of the first stage has at least one one-dimensional decision space, i.e. an associated output signal is only delivered on the basis of the supplied input signal.

In the further stages, the equalizers have at least one two-dimensional decision space, i.e. the decision of the output signal to be delivered is made taking into consideration the equalization of the other path in each case. The decision space is determined by the metrics. I.e. the metrics are used for making the decision. For the decision, each equalizer has a metric corresponding to FIG. 5, for example a metric table, according to which, for a received in-phase signal value, the in-phase signal value probably transmitted is determined taking into consideration the quadrature signal value in accordance with FIG. 5. I.e., there is a so-called probability density function, WDF for short, for received combinations of the in-phase and quadrature signals in order to be able to determine the in-phase and quadrature signals most probably transmitted.

The equalizer can also be implemented in such a manner that its decision is made by
a) a threshold switch such as an adaptive threshold switch or a threshold switch with distributed feedback equalizer, or
b) a detection unit or
c) an MLSE.

In this context, the threshold switch, the detection unit or MLSE can be preceded by a filter such as a finite impulse response filter, FIR filter for short, an infinite impulse response filter, IIR filter for short, or an analog filter.

In the text which follows, the invention will be discussed again in greater detail.

In the case of multi-level modulation methods, a bit sequence or a bit pattern is represented by a point in the two-dimensional representation or in the complex signal space, respectively. During the transmission of a quadrature-modulated signal, both the in-phase component and the quadrature component are distorted, i.e. a point in the signal space at the transmitting end no longer corresponds to the point in the signal space at the receiving end.

Since the distortion generally affects both the in-phase component (the real component) and the quadrature component (the imaginary component) and the two components are coupled together, the information contained in the coupling is neglected in the case of separate equalization. According to the invention, the coupling information is now utilized in such a manner that the first equalization stage evaluates both components separately and they are mutually taken into consideration in the subsequent stages.

There is only a restricted number of path metrics or state transitions for the signal sequence transmitted available to the first equalization stage. The restriction is based on the fact that, in this first equalization stage, only one of two (or more) possible dimensions are taken into consideration for the evaluation. This reduction results in metrics which are the result of an averaging over a relatively large number of state transitions originally modeled multi-dimensionally.

In the second equalization stage, the metrics to be considered for the complementary signals already determined can be selected from a relatively large number of states or state transitions and thus more or more accurate information can be used for the equalization. The predecision of the complementary signal (in-phase or quadrature) provides a measure of the probability of the state of a signal to be evaluated and is used as selection criterion.

The coupling information can now be utilized step by step in the best possible manner in further equalization steps.

As a rule, the gain in performance decreases step by step with the number of stages. The comparison of the equalized sequences of two successive stages (iterations) is a measure of the gain in performance. The lower the change, the lower the gain in performance. If no more changes occur from a particular stage onward, a maximum equalization has been performed. The equalization can be terminated in or after this stage.

The invention is independent of a method for determining the metrics by the metrics generator MG. This can be done independently of the equalization, for example operate in a rigid and hardware-based manner.

Due to the parallel arrangement of interconnected individual components according to the invention, a low level of complexity is achieved which provides for simple equalization of multi-level modulation methods.

If the complexity is measured by means of the states in the equalizer, $M^L$ states are obtained for the optimum complex equalizer with a memory length L of the equalizer and a number M of discrete values or levels of the multi-level modulation method. In contrast, a complexity of $(2 \cdot i \cdot 2^L)$ states is obtained for a concatenation according to the invention with i cascaded equalizer stages or iterations which are arranged in two parallel chains.

Using equalizers such as, in particular, MLSE, and cross-coupling them makes it possible to achieve a higher performance in comparison with individual components (MLSE) in the case of high processing rates or data rates.

A reduction in complexity is achieved by the cross-coupled iterative arrangement.

In this arrangement, all components can be implemented based on hardware which makes it possible to achieve very high data rates.

Furthermore, each equalizer can be followed by a forward error correction unit, FEC unit for short, for error correction. Thus, FEC units can be arranged between individual equalizers.

Furthermore, each equalizer can use one and the same metric of the metrics generator MG so that this synergy provides an economic arrangement or method, respectively.

Furthermore, the equalizer of the first stage can be, for example, an MLSE, a threshold decider or another detection unit. The first stage only needs a halfway "correct" estimation, BER<10%. If an MLSE is used, the synergy effect in the formation of the metrics based on the probability densities WDFs can be utilized. These can be formed from the metrics of the subsequent stages by simple averaging. For the second stage (1st iteration) a distinction must be made between the "complete" metric, which contains all possible states and their WDFs, and their subsets.

Using a predecision, an "advantageous" subset is selected from the complete metric. For example: a state modeling with three symbols for QPSK modulation: Z={Iv, Qv, I, Q, In, Qn}, binary I, Q; 4^3 states. Iv, I, In are known from the I path of the preceding iteration. For the current iteration of the Q path, only states containing this pattern are selected, i.e. the remaining 2^3 advantageous states only contain permutations with respect to Qv, Q, Qn.

The invention claimed is:

1. A receiver for a quadrature-modulated signal, the signal being divided into an in-phase signal and a quadrature signal, the receiver comprising:
    a multitude of equalizers implemented in hardware, each equalizer having a first input, a second port and an output;
    the in-phase signal being fed into the first input of a first and third equalizer;
    the quadrature signal being fed into the first input of a second and a fourth equalizer;
    said first equalizer and said second equalizer, in each case, carrying out a first equalization of the respective signal, such that the output of the first equalizer is connected to the second input of the fourth equalizer which, by means of a second equalization of the quadrature signal in dependence on the supplied equalized in-phase signal of the first equalizer, delivers an equalized quadrature signal; and
    the output of the second equalizer is connected to
    the second input of the third equalizer, which, through a second equalization of the in-phase signal in dependence on the supplied equalized quadrature signal of the second equalizer, delivers an equalized in-phase signal.

2. The receiver as claimed in claim 1, wherein
    the in-phase signal is supplied to a fifth equalizer and the quadrature signal is supplied to a sixth equalizer, and
    the output of the third equalizer is connected to a second input of the sixth equalizer and the output of the fourth equalizer is connected to a second input of the fifth equalizer so that the fifth and sixth equalizer carry out a third equalization in dependence on the result of the second equalization of the other signal, in each case, and an equalized in-phase signal or quadrature signal is present at the output of the fifth and sixth equalizer.

3. The receiver as claimed in claim 2, wherein additional equalizers are provided which are in each case supplied with the in-phase signal or quadrature signal and the respective other equalized signal of the preceding stage so that at least one further equalization can be carried out.

4. The receiver as claimed in claim 1, wherein the signal path of the in-phrase signal and of the quadrature signal in each case has an analog/digital converter.

5. The receiver as claimed in claim 1, wherein the equalizers are constructed as digital filters.

6. The receiver as claimed in claim 1, wherein the equalizers are constructed as maximum likelihood sequence estimation equalizers.

7. The receiver as claimed in claim 1, wherein at least one equalizer is constructed as a series circuit of a filter and of a maximum likelihood sequence estimation equalizer or of a threshold switch or a detection device.

8. The receiver as claimed in claim 7, wherein the filter is constructed as FIR filter, IIR filter or analog filter.

9. The receiver as claimed in claim 6, wherein
    the maximum likelihood sequence estimation equalizers have a comparison table and a comparison device which carries out a Viterbi algorithm.

10. The receiver as claimed in claim 9, wherein the comparison table of the first and second equalizer is initialized with first data of a first metric and the further equalizers are initialized with second data of a second metric.

11. The receiver as claimed in claim 10, wherein the first and second data of the first and second metric originate from a comparison of the unequalized in-phase signals and quadrature signals with the equalized in-phase signals and quadrature signals.

12. The receiver as claimed in claim 1, wherein at least one equalizer is followed by a forward error correction unit.

13. A method for equalizing a quadrature-modulated signal which is divided into an in-phase signal and a quadrature signal, comprising:
    providing at least a first equalizer, a second equalizer, a third equalizer and a fourth equalizer configured to perform an equalization of an equalized or non-equalized in-phase or quadrature signal;
    generating, by means of an equalization of the in-phase signal, an equalized first in-phase signal;
    generating, by means of an equalization of the quadrature signal, an equalized first quadrature signal;
    generating and delivering, by means of a further equalization of the quadrature signal dependent on the equalized first in-phase signal, an equalized second quadrature signal; and
    generating and delivering, by means of a further equalization of the in-phase signal dependent on the equalized first quadrature signal, an equalized second in-phase signal.

14. The method as claimed in claim 13, wherein
    the in-phase signal is supplied to a fifth equalizer and the quadrature signal is supplied to a sixth equalizer,
    the equalized second in-phase signal is supplied to the sixth equalizer which equalizes the quadrature signal dependent on the equalized second in-phase signal and delivers an equalized third quadrature signal,
    the equalized second quadrature signal is supplied to the fifth equalizer which equalizes the in-phase signal dependent on the equalized second quadrature signal and delivers an equalized third in-phase signal.

15. The method as claimed in claim 14, wherein additional equalizers are connected downstream which are in each case supplied with the in-phase signal or quadrature signal and the respective other equalized signal of the preceding stage so that at least one further equalization is carried out.

16. The method as claimed in claim 13, wherein before the equalization, the in-phase signal and the quadrature signal are converted from analog to digital.

17. The method as claimed in claim 16, wherein the equalizers are constructed as digital filters.

18. The method as claimed in claim 13, wherein the equalizers are constructed as maximum likelihood sequence estimation equalizers.

19. The method as claimed in claim 18, wherein a comparison table and a comparison device executing a Viterbi algorithm are provided in the maximum likelihood sequence estimation equalizers.

20. The method as claimed in claim 19, wherein the comparison table of the first and second equalizer is initialized with first data of a first metric and the further equalizers are initialized with second data of a second metric.

21. The method as claimed in claim 20, wherein the first and second data of the first and second metric are determined by comparing the unequalized in-phase signal or quadrature signal with the equalized in-phase signal or quadrature signal, respectively.

* * * * *